US 7,019,216 B2

(12) United States Patent
Feuerstein et al.

(10) Patent No.: US 7,019,216 B2
(45) Date of Patent: Mar. 28, 2006

(54) GENERATOR OUTPUT LINE, IN PARTICULAR FOR A CONNECTION REGION IN THE GENERATOR BASE

(75) Inventors: Winfried Feuerstein, Erlangen (DE); Franz Schreiner, Roding (DE)

(73) Assignee: Siemens Aktiengesellschaft, Munich (DE)

( * ) Notice: Subject to any disclaimer, the term of this patent is extended or adjusted under 35 U.S.C. 154(b) by 126 days.

(21) Appl. No.: 10/685,784

(22) Filed: Oct. 16, 2003

(65) Prior Publication Data

US 2005/0056440 A1   Mar. 17, 2005

(30) Foreign Application Priority Data

Oct. 16, 2002 (EP) .................. 02023222

(51) Int. Cl.
*H01R 4/00* (2006.01)
(52) U.S. Cl. .................. 174/84 C; 174/88 C
(58) Field of Classification Search ............ 174/74 R, 174/78, 79, 84 R, 88 R, 88 C, 75 C
See application file for complete search history.

(56) References Cited

U.S. PATENT DOCUMENTS 2,742,582 A    4/1956  Bahn et al.
3,902,000 A *  8/1975  Forsyth et al. ............ 174/15.3
4,132,853 A    1/1979  Wagenaar
4,197,571 A *  4/1980  Grunert .................... 361/611
4,393,714 A *  7/1983  Schmidt ..................... 73/718

FOREIGN PATENT DOCUMENTS

| DE | 2545832  |   | 4/1977  |
| DE | 19619729 |   | 11/1997 |
| GB | 443017   |   | 7/1934  |
| GB | 443017   | * | 2/1936  |
| GB | 725211   |   | 5/1953  |

* cited by examiner

Primary Examiner—William H. Mayo, III
(74) Attorney, Agent, or Firm—Harness, Dickey & Pierce, P.L.C.

(57) ABSTRACT

A generator output line is for electrically connecting a generator to a transformer. It includes a cylindrical inner conductor and a cylindrical cladding tube connection region which is arranged concentrically with respect to the inner conductor. The inner conductor is made up of an internal conductor tube and an external conductor tube, preferably in each case made of aluminum, and is constructed such that the current paths in the longitudinal direction of the inner conductor change at least once between the external conductor tube and the internal conductor tube.

24 Claims, 4 Drawing Sheets

Detail B

Detail E

GENERATOR OUTPUT LINE, IN PARTICULAR FOR A CONNECTION REGION IN THE GENERATOR BASE

The present application hereby claims priority under 35 U.S.C. §119 on European patent application number EP 02023222.9 filed Oct. 16, 2002, the entire contents of which are hereby incorporated herein by reference.

FIELD OF THE INVENTION

The present invention genrally relates to a generator output line for electrically connecting a generator to a transformer. In particular, it relates to a generator output line of this type which can be used in a connection region in the generator base.

BACKGROUND OF THE INVENTION

Heavy-current connections, so-called generator output lines, are the electrical connection between a stator winding of a generator within a generator housing and an associated generator transformer or unit-connected transformer in power plants. This electrical connection usually has a phase-isolated construction, i.e. each of the three current conductors of the three-phase system is arranged in a separate, likewise electrically conductive casing, a so-called output line cladding (also known as a cladding tube), having a coaxial structure. Generator output lines of this type are disclosed, for example, in DE 25 45 832 C2 and DE 196 19 729 A1.

For better understanding, reference is first made to FIGS. 4 and 5 for describing the construction of a conventional generator output line. The generator output line 10 substantially includes a cylindrical inner conductor 11 and a cylindrical cladding tube connection region 12 which is arranged concentrically with respect to the inner conductor 11 and encapsulates the inner conductor. The three isolated cladding tube connection regions 12 associated with the three inner conductors 11 of the three phases are linked up with the three generator bushings 16 in a connection region in the generator base 14 underneath a generator.

In order to increase the mechanical stability with respect to vibrations, the inner conductors 11 are connected to the generator bushings 16 via flexible expanding copper strips 18. For the same reason, the cladding tube connection region 12 may also have an expanding bellows (not shown). The inner conductor 11 is also sealed off from the inner wall of the cladding tube connection region 12 by a disk bushing 20, for example made of cast resin. In conventional generator output lines 10, both the cylindrical inner conductors 11 and the cladding tube connection region 12 are made of pure aluminum $Al_{99.5}$. Connected to the generator output lines 10 are conductor tubes 22 and cladding tubes 23, each having a larger diameter than the inner conductors 11 and the cladding tube connection region 12, respectively.

The electrical voltage level of the generators and the generator output lines is nowadays between 12 and 36 kV (so-called medium-voltage level), depending on the rated power of the generator. According to this voltage level, the clearance between the inner conductor and the cladding tube (ground potential) has to be at least 120 to 320 mm. For example, in the case of steam power plants having rated generator powers of 600 to 900 MW and a generator voltage of 21 to 27 kV, a current intensity of between 18 and 25 kA is produced both in the inner conductor and in the outer cladding tube.

These currents result in $I^2R$ losses which lead to an increase in the temperature of the inner conductor and of the cladding tube. In order to be able to keep to the maximum permissible temperatures, as set by the IEC and the ANSI, of 90° C. for the inner conductor and 70° C. for the cladding tube, the diameters and the wall thicknesses of both the inner conductor and the cladding tube need to be dimensioned accordingly.

Normally, there is sufficient space to install the three single-phase generator output lines when they are made of aluminum, irrespective of the voltage and current values. Only in the case of a connection region in a generator base, as shown in FIG. 4, are copper inner conductors conventionally used owing to the technical/electrical requirements and the very small amount of space available as well as the small gap between the generator bushings on the generator. By virtue of their better electrical conductivity, these copper tubes require smaller diameters and smaller wall thicknesses than aluminum tubes to carry the same current intensities whilst keeping to the permissible temperatures.

In addition to the increased material costs, the increased problems presented when welding and the increased weight of copper in comparison with aluminum, a particular problem with copper is the fact that it is necessary to provide a special soldered or welded electrical connection 24 between the thinner copper inner conductor 11 and the aluminum conductor tube 22 connected to it, which has a larger diameter.

SUMMARY OF THE INVENTION

There was therefore the need, in particular for connection regions in the generator base, to develop simpler and less expensive constructions for generator output lines.

An embodiment of the invention is therefore based on an object of providing a generator output line having a space-saving and, at the same time, simple construction which meets the electrical requirements and keeps to the thermal limit values. In particular, it is also suitable for use in connection regions in the generator base in the case of comparatively large rated unit powers of, for example, more than 18 kA.

An object my be achieved according to an embodiment of the invention by the inner conductor of the generator output line having an internal tube and an external tube, and by the current paths in the direct-axis direction of the inner conductor changing at least once between the external tube and the internal tube.

An embodiment of the invention is there-by based on the concept that, instead of producing the inner conductor from copper, it is again produced from the lighter, less expensive aluminum, which is easier to work with, and that nevertheless a space-saving construction is found. For this purpose, a so-called twin-tube solution, which includes an internal tube and an external tube and has the same external dimension as the conventional space-saving solution of the known copper inner conductor, is proposed for the inner conductor in the generator output line.

With this twin-tube solution, the total current of the generator is intended to be divided into two approximately equal parts. When direct current is transferred through the inner conductor, the internal tube and the external tube do in fact each carry approximately 50% of the total current. This does not, however, apply in the case of alternating current.

When it is alternating current that is being transferred, nearly all of the current (>95%) flows in the external tube of the inner conductor. The reason for this effect is the different AC impedance of the two tubes, or the skin effect which occurs in the case of alternating current. The two concentric tubes of the inner conductor are electrically the same as a tubular conductor which has nearly all of the current flowing through its outer tube cladding. Since, owing to the standardized generator connection configuration, the external tube of the inner conductor has the same diameter as the known copper inner conductor, it is likely that the permissible inner conductor temperatures will be markedly exceeded owing to the fact that aluminum is less conductive than copper. Merely providing the inner conductor with a twin-tube construction does not therefore achieve the above-mentioned object.

An aim is therefore to provide approximately the same flow of current in the two tubes of the inner conductor in the twin-tube solution for the inner conductor. This is achieved according to an embodiment of the invention by the current paths in the direct-axis direction of the inner conductor being changed at least once between the external tube and the internal tube of the inner conductor. By changing the current paths from the internal tube to the external tube and vice versa, the AC impedance, the electrical variable influencing the current distribution, between the two current paths and thus also the flow of current between the two current paths, can be made the same. By dividing the generator current between the internal tube and the external tube, it is possible to keep to the permissible temperature limit values, even if aluminum is used instead of copper for the inner conductor.

The current paths in the direct-axis direction of the inner conductor advantageously change once, at a central position in the longitudinal direction of the inner conductor, between the external tube and the internal tube, resulting in the current being divided into two approximately equal parts.

In order for the current to be divided as equally as possible, the internal tube and the external tube of the inner conductor should also be arranged concentrically.

The change of the current paths takes place in a preferred exemplary embodiment by the internal and external tubes of the inner conductor being separated in each case in the transverse direction and then being connected to one another again, crossed over.

As already mentioned, the generator output line of an embodiment of the present invention is particularly suitable for use in a connection region in the generator base.

Avantages achieved by at least one embodiment of the invention include, in particular, that, for a space-saving and compact construction of a generator output line, aluminum can be used for the inner conductor. The use of aluminum is advantageous in terms of costs since the material costs are lower and it is easier to work with than copper. In addition, no complex soldering or welding connections are required between the copper and aluminum material. The lower weight of aluminum is also advantageous as regards transportation and handling on site.

BRIEF DESCRIPTION OF THE DRAWINGS

The present invention will become more fully understood from the detailed description of preferred embodiments given hereinbelow and the accompanying drawings, which are given by way of illustration only and thus are not limitative of the present invention, and wherein.

DETAILED DESCRIPTION OF THE PREFERRED EMBODIMENTS

Figure 1:
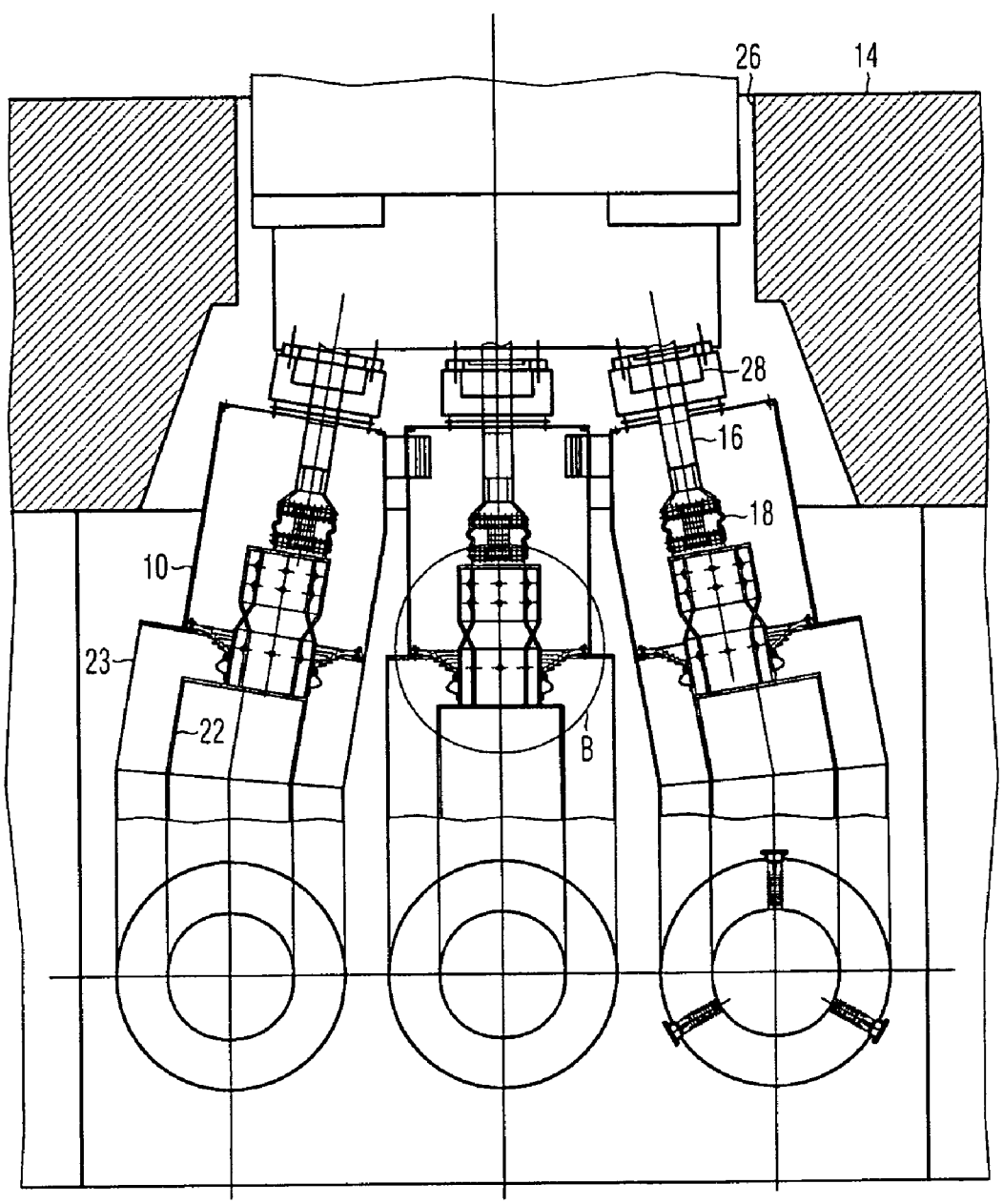
FIG. 1 shows a schematic illustration of the connection of three generator output lines according to an embodiment of the present invention in a connection region in the generator base.

Described below is a preferred exemplary embodiment of a generator output line according to the present invention which can be advantageously used in a connection region in the generator base. For improved clarity, the same reference numerals are used for the same components or elements as in the conventional generator output line from FIGS. 4 and 5.

Provided in the generator base 14 of a generator is a generator base opening 26, through which the three electrical connections of the three-phase system are led out of the generator housing via connection pieces 28 and generator bushings 16. The generator output lines 10 of the three phases each include a cylindrical inner conductor 11 and a cladding tube connection region 12, which is arranged concentrically with respect to the inner conductor 11, for encapsulating the phases of the inner conductor 11. The inner conductors 11 are connected to the generator bushings 16 via flexible expanding copper strips 18 in order to ensure mechanical stability with respect to vibrations for the electrical connection. For the same reason, the cladding tube connection region 12 may also be provided with an expansion capacitor (not shown) in the form of bellows or a corrugated tube.

Figure 2:
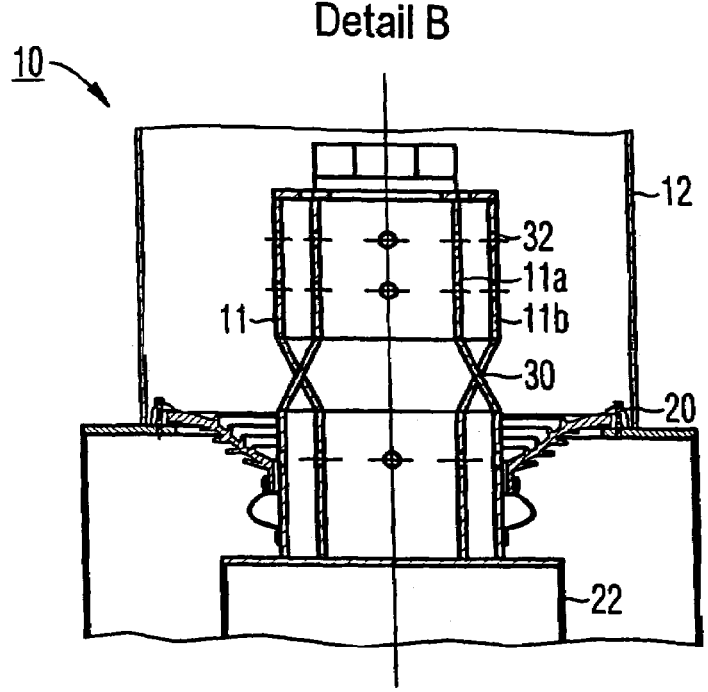
FIG. 2 an enlarged illustration of the detail B from FIG. 1 which shows the construction of a preferred exemplary embodiment of a generator output line according to an embodiment of the invention.

As can be seen in particular in FIG. 2, the inner conductor 11 is sealed off from the inner wall of the cladding tube connection region 12 by a cast resin disk bushing 20. In addition, the inner conductor 11 merges with an internal conductor tube 22 having a larger diameter, and the cladding tube connection region 12 merges with a cladding tube 23 having a larger diameter. Both the inner conductor 11 and the cladding tube connection region 12 are made of aluminum, in particular pure aluminum $Al_{99.5}$.

Figure 5:
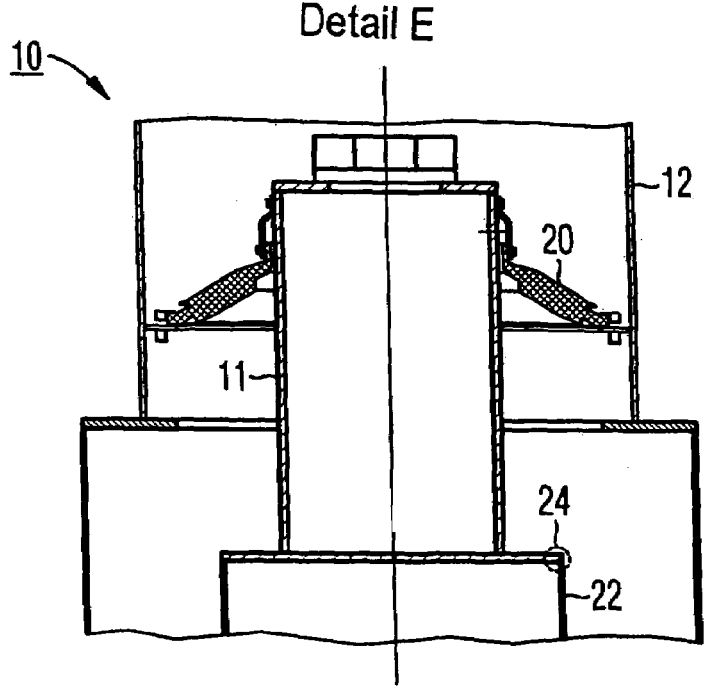
FIG. 5 shows an enlarged illustration of the detail E from FIG. 4 which shows the construction of the conventional generator output line.
Figure 4:
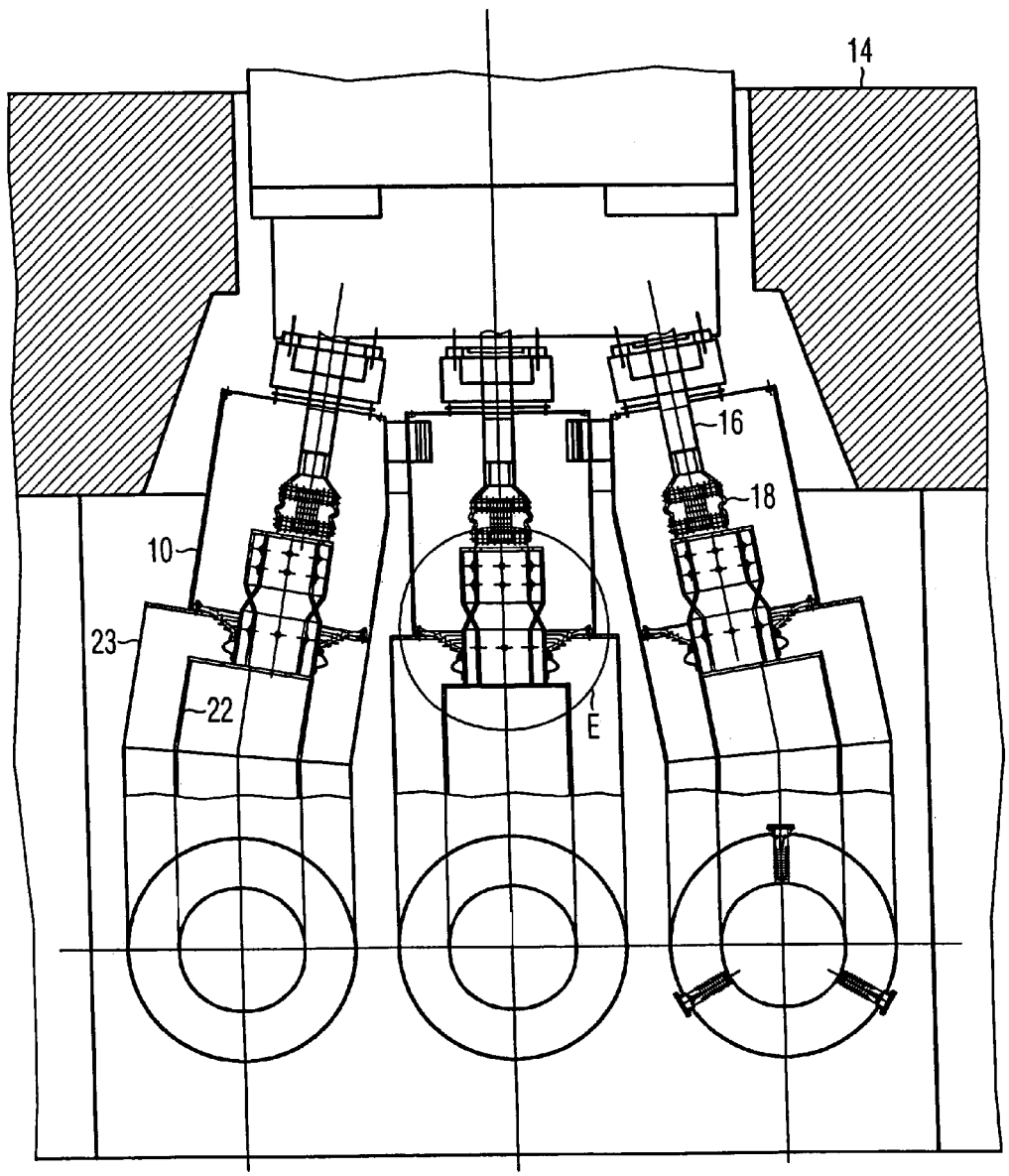
FIG. 4 shows a schematic illustration of the connection of three conventional generator output lines in a connection region in the generator base.

The external diameter Da of the aluminum inner conductor 11 of the generator output line 10 according to an embodiment of the invention corresponds to the external diameter of the copper inner conductor of conventional construction from FIGS. 4 and 5. A result is that the existing configurations for single-phase generator connection solutions, i.e. the configuration of the generator base 14 and the compact arrangement of the generator bushings 16, can be retained.

Figure 3B:
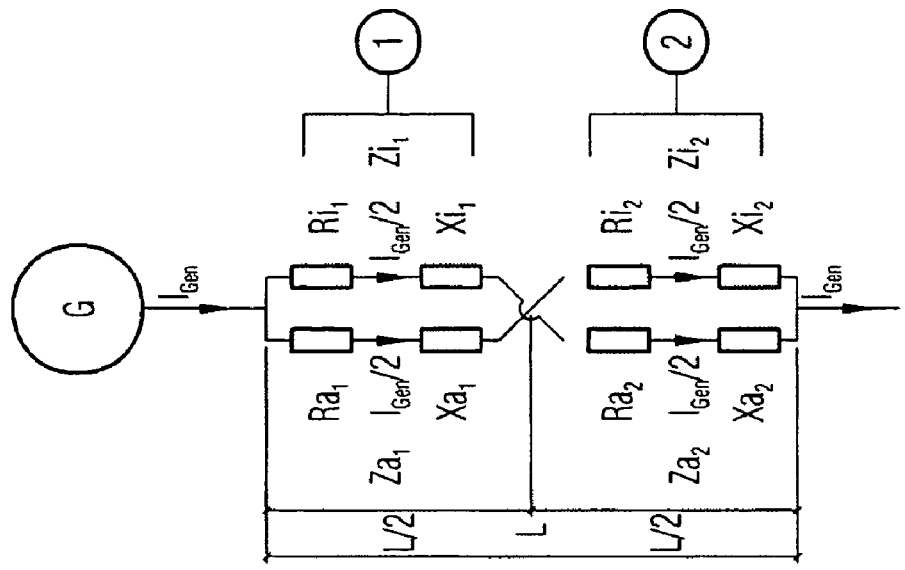
FIGS. 3a and b show an enlarged illustration of the inner conductor of the generator output line from FIG. 2 and an equivalent circuit diagram thereof, respectively.
Figure 3A:
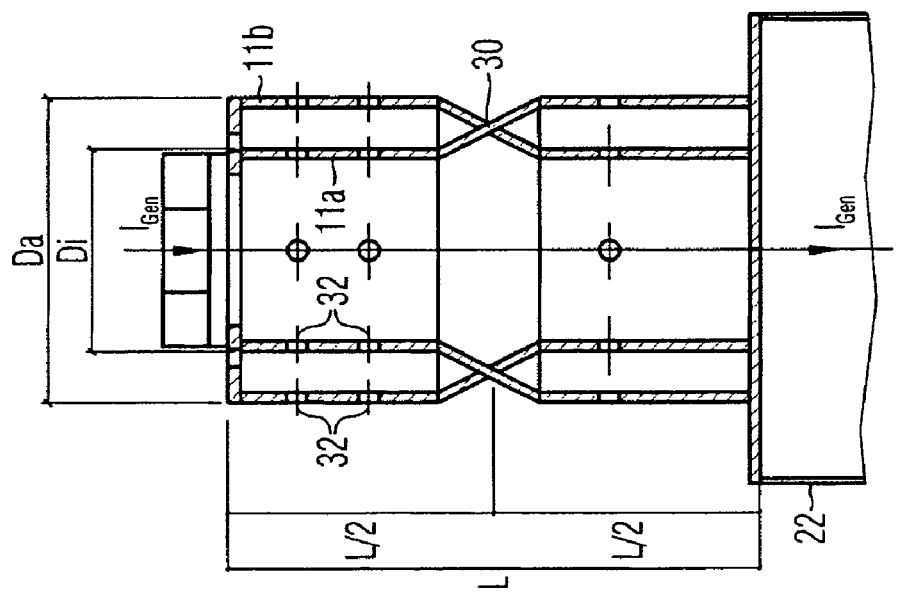

As is shown in FIGS. 2 and 3a, the cylindrical aluminum inner conductor 11 has a so-called twin-tube construction, i.e. the inner conductor 11 is constructed from an internal conductor tube 11a and an external conductor tube 11b as well as a cross-over connection 30. The internal conductor tube 11a and the external conductor tube 11b are preferably arranged concentrically with respect to one another and are both produced from aluminum. In order to produce the cross-over connection 30, the internal and external conductor tubes 11a, 11b are separated, for example, in the transverse direction of the inner conductor 11 and then connected again by welding via an X-connection with flat aluminum sections.

This twin-tube construction of the inner conductor 11 causes the current paths in the inner conductor 11 in the longitudinal direction of the inner conductor 11 to change, at the point of the cross-over connection 30, between the internal conductor tube 11a and the external conductor tube 11b. This causes the total generator current $I_{Gen}$ to be divided between the internal conductor tube 11a and the external conductor tube 11b even when it is alternating current that is being transferred.

In order for the generator current $I_{Gen}$ to be divided equally between the internal conductor tube 11a and the external conductor tube 11b, the cross-over connection 30 should be arranged in the central position in the longitudinal direction, i.e. at half the length L/2 of the inner conductor 11. Furthermore, the geometries of the inner conductor 11, i.e. the diameters and the wall thicknesses of the conductor tubes 11a and 11b, should be the same in the first and second sections.

At this stage it is pointed out, however, that the present invention is not limited to one change of the current paths in the center of the inner conductor 11. It is in principle also possible to provide two or more changes of the current paths between the internal conductor tube 11a and the external conductor tube 11b. For example, a first change may take place at approximately ¼ and a second change at approximately ¾ of the length of the inner conductor 11. Neither is the cross-over connection 30 limited to the abovementioned construction, but it should have as low an impedance as possible.

As can be seen from the equivalent circuit diagram of the twin-tube construction from FIG. 3b, on the one hand the inductive reactances Xa of the external conductor tube 11b are the same in the first and second sections ($Xa_1=Xa_2$). Further, the resistances Ra of the external conductor tube 11b are the same in the first and second sections ($Ra_1=Ra_2$). On the other hand the inductive reactances Xi of the internal conductor tube 11a are the same in the first and second sections ($Xi_1=Xi_2$), and the resistances Ri of the internal conductor tube 11a are the same in the first and second sections ($Ri_1=Ri_2$). Thus, the AC impedances Za of the external conductor tube 11b are also the same in the first and second sections ($Za_1=Za_2$), and the AC impedances Zi of the internal conductor tube 11a are the same in the first and second sections ($Zi_1=Zi_2$).

Furthermore, the AC impedance of one current path, which runs in the first section through the external conductor tube 11b and in the second section through the internal conductor tube 11a, is $Z=Za_1+Zi_2$, and the AC impedance of the other current path, which runs in the first section through the internal conductor tube 11a and in the second section through the external conductor tube 11b, is $Z=Zi_1+Za_2$. As $Za_1=Za_2$ and $Zi_1=Zi_2$, the AC impedances Z in the two current paths are the same. As the AC impedances Z are the same in the two current paths, the same current must also flow in the two current paths, namely $I=I_{Gen}/2$.

By the current flow through the internal conductor tube 11a and the external conductor tube 11b of the inner conductor 11 preferably being divided equally in this way, the $I^2R$ losses are automatically also divided equally between the two conductor tubes 11a and 11b, with the result that the permissible temperatures for the inner conductor 11 can be kept to, even if aluminum, which is less electrically conductive than copper, is used for the internal and external conductor tubes 11a, 11b of the inner conductor 11.

As shown in FIGS. 2 and 3a, the internal and external conductor tubes 11a and 11b of the inner conductor 11 also have ventilation openings 32 in order to allow the inner conductor 11 to be cooled from the outside and from the inside with cooling air, in particular by means of natural convection.

In one exemplary embodiment, which has already been tested in practice, of a generator output line 10 according to an embodiment of the invention having the abovedescribed construction, the length L of the inner conductor 11 is, for example, approximately 1.0 to 2 m, the diameter of the cladding tube connection region 12 is approximately 1.3 to 1.5 m, the external diameter Da of the external conductor tube 11b of the inner conductor 11 is approximately 600 mm, and the external diameter Di of the internal conductor tube 11a is approximately 400 mm. The wall thicknesses of the internal and external conductor tubes 11a and 11b are in each case approximately 20 mm.

Exemplary embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A generator output line for electrically connecting a generator to a transformer, comprising:
a cylindrical inner conductor including an internal conductor tube and an external conductor tube; and
a cylindrical cladding tube connection region, arranged concentrically with respect to the inner conductor, wherein current paths in a longitudinal direction of the inner conductor change between the external conductor tube and the internal conductor tube at least once.

2. The generator output line as claimed in claim 1, wherein the internal and external conductor tubes are produced from aluminum.

3. The generator output line as claimed in claim 2, wherein current paths in a direct-axis direction of the inner conductor change once, at a central position in the longitudinal direction of the inner conductor, between the external conductor tube and the internal conductor tube.

4. The generator output line as claimed in claim 3, wherein the internal conductor tube and the external conductor tube of the inner conductor are arranged concentrically.

5. The generator output line as claimed in claim 2, wherein the internal conductor tube and the external conductor tube of the inner conductor are arranged concentrically.

6. The generator output line as claimed in claim 2, wherein the internal and external conductor tubes are separated in a transverse direction and connected to one another again, crossed over, in order to change the current paths.

7. The generator output line as claimed in claim 2, wherein the generator output line is arranged in a generator connection region in the generator base.

8. The generator output line as claimed in claim 1, wherein current paths in a direct-axis direction of the inner conductor change once, at a central position in the longitudinal direction of the inner conductor, between the external conductor tube and the internal conductor tube.

9. The generator output line as claimed in claim 8, wherein the internal conductor tube and the external conductor tube of the inner conductor are arranged concentrically.

10. The generator output line as claimed in claim 8, wherein the internal and external conductor tubes are separated in a transverse direction and connected to one another again, crossed over, in order to change the current paths.

11. The generator output line as claimed in claim 8, wherein the generator output line is arranged in a generator connection region in the generator base.

12. The generator output line as claimed in claim 1, wherein the internal conductor tube and the external conductor tube of the inner conductor are arranged concentrically.

13. The generator output line as claimed in claim 8, wherein the internal and external conductor tubes are separated in a transverse direction and connected to one another again, crossed over, in order to change the current paths.

14. The generator output line as claimed in claim 1, wherein the internal and external conductor tubes are separated in a transverse direction and connected to one another again, crossed over, in order to change the current paths.

15. The generator output line as claimed in claim 1, wherein the generator output line is arranged in a generator connection region in the generator base.

16. An output line of a generator, comprising:
    a cylindrical inner conductor including an internal conductor tube and an external conductor tube; and
    a cylindrical cladding tube connection region, arranged concentrically with respect to the inner conductor, wherein
        the external conductor tube and the internal conductor tube are crossed-over changing current paths of the internal conductor at least once.

17. The generator output line as claimed in claim 16, wherein the internal and external conductor tubes include aluminum.

18. A generator, comprising:
    an output line, wherein the output line includes,
        a cylindrical inner conductor including an internal conductor tube and an external conductor tube, and
        a cylindrical cladding tube connection region, arranged concentrically with respect to the inner conductor, wherein
        current paths in a longitudinal direction of the inner conductor change at least once between the external conductor tube and the internal conductor tube.

19. The generator as claimed in claim 18, wherein the internal and external conductor tubes include aluminum.

20. A generator, comprising:
    a generator base, including an opening through which three electrical connections of a three-phase system exit the generator base, wherein generator output lines of the three phases each include,
        a cylindrical inner conductor including an internal conductor tube and an external conductor tube, and
        a cylindrical cladding tube connection region, arranged concentrically with respect to the inner conductor, wherein
        current paths in a longitudinal direction of the inner conductor change between the external conductor tube and the internal conductor tube at least once.

21. The generator of claim 20, wherein the three-phase system exits the generator base via at least one connection piece and at least one generator bushing.

22. The generator as claimed in claim 20, wherein the internal and external conductor tubes include aluminum.

23. The generator as claimed in claim 20, wherein current paths in a direct-axis direction of the inner conductor change once, at a central position in the longitudinal direction of the inner conductor, between the external conductor tube and the internal conductor tube.

24. The generator as claimed in claim 20, wherein the internal conductor tube and the external conductor tube of the inner conductor are arranged concentrically.

* * * * *